United States Patent
Jokinen et al.

(10) Patent No.: US 11,051,464 B2
(45) Date of Patent: Jul. 6, 2021

(54) REDUCTION OF NITRATE CONTENT IN PLANTS

(71) Applicant: LUONNONVARAKESKUS, Helsinki (FI)

(72) Inventors: Kari Jokinen, Helsinki (FI); Pirjo Mäkelä, Tennilä (FI)

(73) Assignee: LUONNONVARAKESKUS, Helsinki (FI)

( * ) Notice: Subject to any disclaimer, the term of this patent is extended or adjusted under 35 U.S.C. 154(b) by 0 days.

(21) Appl. No.: 16/869,881

(22) Filed: May 8, 2020

(65) Prior Publication Data

US 2020/0352115 A1    Nov. 12, 2020

(30) Foreign Application Priority Data

May 9, 2019 (FI) .................................... 20195382

(51) Int. Cl.
| | |
|---|---|
| *A01G 22/15* | (2018.01) |
| *C05F 11/10* | (2006.01) |
| *A01G 9/24* | (2006.01) |
| *A01C 21/00* | (2006.01) |

(52) U.S. Cl.
CPC ............. *A01G 22/15* (2018.02); *A01C 21/00* (2013.01); *A01G 9/247* (2013.01); *C05F 11/10* (2013.01)

(58) Field of Classification Search
None
See application file for complete search history.

(56) References Cited

U.S. PATENT DOCUMENTS

| | | | | |
|---|---|---|---|---|
| 2007/0131010 A1* | 6/2007 | Binder | ..................... | C05C 3/00 71/23 |
| 2008/0250710 A1* | 10/2008 | Hirasawa | ............... | A01N 37/02 47/58.1 LS |
| 2013/0237424 A1* | 9/2013 | Funada | ..................... | C05C 3/00 504/320 |
| 2018/0319713 A1* | 11/2018 | Wecker | ................... | C12P 21/00 |
| 2019/0194080 A1* | 6/2019 | Nasholm | ................ | A01G 17/00 |
| 2020/0214286 A1* | 7/2020 | Moussaoui | ........... | A01N 65/03 |

FOREIGN PATENT DOCUMENTS

| | | | | |
|---|---|---|---|---|
| CN | 1686958 A | | 10/2005 | |
| CN | 101849497 A | | 1/2010 | |
| CN | 102219599 B | | 3/2013 | |
| CN | 104163710 A | | 11/2014 | |
| CN | 105660126 A | * | 6/2016 | ............. A01C 21/00 |
| CN | 107896606 A | | 4/2018 | |

(Continued)

OTHER PUBLICATIONS

U.S. Appl. No. 62/789,034, filed Jan. 7, 2019 (corresponding to US 2020/0214286 to Moussaoui).*

(Continued)

*Primary Examiner* — Wayne A Langel
(74) *Attorney, Agent, or Firm* — Nixon & Vanderhye

(57) ABSTRACT

A method for reducing nitrate content in leafy vegetable plants, in particular, in salad crops, is provided. In the method, at least one organic osmolyte compound is delivered, in a predetermined amount, to the plant, preferably, a hydroponically cultivated plant. The method advantageously utilizes betaine compounds. Related preparation and uses are further provided.

20 Claims, 7 Drawing Sheets

(56) References Cited

FOREIGN PATENT DOCUMENTS

| | | | | |
|---|---|---|---|---|
| CN | 109089782 A | * | 12/2018 | ............ A01C 21/00 |
| JP | 1-208386 A | * | 8/1989 | ............ C05G 1/00 |
| JP | H01-208386 A | | 8/1989 | |
| JP | 2005-058342 A | | 2/2002 | |
| JP | 2002058342 A | * | 2/2002 | ............ A01N 25/00 |
| WO | 2008/048080 A1 | | 4/2008 | |
| WO | 2018/156605 | * | 8/2018 | ............ C05G 3/00 |
| WO | 2018/187345 A1 | | 10/2018 | |

OTHER PUBLICATIONS

Finnish Search Report, dated Dec. 4, 2019, from corresponding/related Finnish Application No. 20195382.

F.J. De Zwart et al., "Glycine betaine and glycine betaine analogues in common foods", Food Chemistry, Nov. 2003, pp. 197-204, vol. 83, No. 2, Abstract only.

P. Mäkelä et al., "Growth Response of Pea and Summer Turnip Rape to Foliar Application of Glycinebetaine", Acta Agri. Scand., Sect. B, Soil and Plant Sci., 1997, pp. 168-175, vol. 47.

Pirjo Mäkelä, "Agro-Industrial Uses of Glycinebetaine", Sugar Tech, 2004, pp. 207-212, vol. 6, No. 4.

Office Action issued in Finnish Patent Application No. 20195382 dated Sep. 23, 2020.

International Search Report issued in International Application No. PCT/FI2020/050309 dated Jul. 17, 2020.

Written Opinion of the International Searching Authority issued in International Application No. PCT/FI2020/050309 dated Jul. 17, 2020.

* cited by examiner

REDUCTION OF NITRATE CONTENT IN PLANTS

FIELD OF THE INVENTION

The present invention generally relates to improving quality of commercially feasible leafy vegetable plants. In particular, the invention concerns reducing nitrate content in leafy salad crops hydroponically cultivated in greenhouses or plant factories.

BACKGROUND

Leafy vegetables, in particular, leafy salad greens cultivated throughout the year constitute, at a time being, one of the most economically significant vegetable crops in view of pronounced health benefits imparted by consumption of said leafy salads on a daily basis. Leafy vegetables are important contributors of vitamins, such as vitamins A, C and E; minerals, such as calcium and potassium; and anti-oxidants that include the abovementioned vitamins and flavonoid phytochemicals, such as anthocyanins.

Lettuce (*Lactuca* spp.) salad species, its varieties and cultivars, such as iceberg lettuce, for example, constitutes one of the major leafy vegetable plants cultivated all the year round in greenhouses and plant factories. In mentioned facilities, cultivation of leafy vegetable plants, hereby, leafy vegetable salad plants, typically exploits hydroponics based methods, such as Nutrient Film Technique (NFT), whereupon nutrients dissolved in aqueous solutions are circulated past the root systems of cultivated plants.

One of the major drawbacks associated with hydroponic cultivation methods is that nitrogen (N), an element indispensable for plant growth, is delivered to plants in the form of water-soluble nitrates ($NO_3$), the latter being traditionally used as fertilizers. Some nitrophilic plant species, such as leafy vegetables (e.g. lettuce), in conditions of abundant nitrate supply via nutrient solutions (fertigation solutions) tend to accumulate nitrate in green foliage.

When nitrate uptake far exceeds assimilation by the plant, accumulation of nitrate in plant tissue occurs. As a consequence, nitrate content in edible leafy plants often exceeds maximum limits prescribed by the EU Commission Regulation No 1258/2011. Whether this quality standard is not met, a foodstuff distributor has no option than to return vegetable products back to a farmer, which imposes significant losses on both the farmers and foodstuff distributor chains.

The situation aggravates with a fact that, at present, no alternative method has been offered suitable for industrial cultivation of leafy vegetable crops throughout the year and capable of stably producing high-yield crops along with providing reliable control means over the nitrate content in green foliage.

Another fundamental problem pertains to a fact that, although industrially cultivated leafy vegetable greens, such as leafy salads, contain plenty of compounds essential for promoting human well-being, consumption of said leafy vegetables on daily basis may, in some instances, result in increased nitrate intake and associated health hazards. Thus, excessive nitrate accumulated in plant tissue undergoes enzymatic reduction to nitrite, which can be further converted into nitric oxide (NO), wherein the latter, in presence of oxygen, could be rapidly catalyzed into a peroxynitrite (ONOO—), which is highly toxic to plants. High nitrate accumulation in plants is harmful to human health, as well as to plant growth.

Still, raw vegetables, in particular, fresh salad greens, are a major source for daily nitrate intake by humans, supplying 70-90% of the total nitrate.

A method of reducing nitrate content in soilless-cultivated leafy vegetables is disclosed in CN101849497 (Liu et al). Mentioned publication describes treating industrially cultivated leafy green vegetables with inorganic osmolyte solutions, such as chloride- and sulfate salts of potassium and ammonium, during 2-5 days prior to harvesting, wherein osmolyte treatment is supplemented by artificial lighting. Nevertheless, since it is generally accepted that inorganic ions, such as $K^+$, $NH_4^+$, are engaged in the higher plant cells metabolic pathways, a controversy still exists to which extent the abovementioned inorganic salts interfere into the activity of nitrate reductase (one of the key enzymes involved into nitrate assimilation in plant tissue) and whether a stable rate of nitrate reduction can be preserved by using inorganic nutrient solutions.

Furthermore, one of the major problems associated with utilization of inorganic salts as osmolytes is that, although multiple biochemical processes in the cell require presence of specific inorganic ions, increasing concentrations of said ions above a certain threshold perturbs cell metabolism and, in particular, cell protein function, leading to at least partial protein denaturation and, as a consequence, to decrease in quality of cultivated vegetable products.

In greenhouses, increase of illumination, in terms of intensity and/or duration, is generally shown to reduce nitrate content in leafy plants. In addition to the abovementioned publication CN101849497 that exploits artificial lighting of predetermined intensity and duration, reduction of harmful nitrates in leafy vegetables, such as lettuce and marjoram, has been disclosed in WO08048080 (Zukauskas et al). Light promotes photosynthetic and metabolic processes in plants; thereby nitrate content can be reduced.

However, increased light exposure causes, although indirectly, leaf wilting, also referred to as a leaf burn, in leafy vegetables, wherein strong illumination leads to overheating and drying of the leaf surface. Water moves out of the guard cells that form leaf stomata (pores in the epidermis of leaves), resulting in closing of the stomata, whereby plant transpiration is suppressed or markedly reduced. As a result of suppressed transpiration, uptake of calcium ions and their mobility in the plant tissue are inhibited; therefore, newly formed and/or developing cells and tissues experience severe calcium deficiency. As a consequence, leafy vegetable plants develop brown leaf edges, referred to as leaf burns, which are irreversible and greatly affect salability of leafy salad crops. According to recent estimates, 20-30% of industrially cultivated pot salads must be discarded due to leaf wilting.

Additionally, since calcium plays a key role in regulating the osmotic balance in plant cells, reduced calcium transport through vascular tissue naturally results in nitrate accumulation in green foliage.

In light of the data obtained previously, it appears desirable to complement and update the field of technology related to adjusting nitrate content in leafy vegetable crops to meet the EU regulations, and to develop reliable and reproducible methods for cultivating high quality leafy vegetables, in particular, leafy salad greens in an economically feasible scale which is attainable through exploitation of the hydroponics based methods, in particular, the NFT technology.

SUMMARY OF THE INVENTION

An objective of the present invention is to solve or at least alleviate each of the problems arising from the limitations and disadvantages of the related art. The objective is achieved by various embodiments of a method for reducing nitrate content in leafy vegetable plants, such as leafy salad crops, a related preparation and uses thereof. Thereby, in one aspect of the invention a method for reducing nitrate content in a leafy vegetable plant is provided, according to what is defined in the independent claim 1.

In embodiment, the method comprises delivering a predetermined amount of at least one organic osmolyte to the plant.

In embodiment, the at least one organic osmolyte is selected from the group consisting of: methylamines, amino acids and derivatives thereof, sugars, and sugar alcohols.

In embodiment, the at least one organic osmolyte is a betaine compound. In further embodiments, said at least one organic osmolyte is any one of glycinebetaine, proline betaine, and beta-alanine betaine. In embodiment, the at least one organic osmolyte is glycinebetaine.

In embodiment, the method is provided, in which the leafy vegetable plant is hydroponically cultivated. In further embodiment, said plant is cultivated by a Nutrient Film Technique (NFT) in a greenhouse or in a plant factory.

In embodiment, the least one organic osmolyte is delivered into the leafy vegetable plant through its roots.

In embodiment, the leafy vegetable plant is selected from any one of lettuce, endive, and rucola.

In another aspect, a preparation is provided that comprises at least one organic osmolyte and it is deliverable, in a predetermined amount, to a leafy vegetable plant to reduce nitrate content in said plant.

In embodiment, the preparation comprises at least one organic osmolyte selected from the group consisting of: methylamines, amino acids and derivatives thereof, sugars, and sugar alcohols.

In embodiment, the at least one organic osmolyte in said preparation is a betaine compound. In embodiments, said betaine compound is selected from glycinebetaine, proline betaine, and beta-alanine betaine. In embodiment, the at least one organic osmolyte in said preparation is glycinebetaine.

In further aspect, use of organic osmolytes to reduce nitrate content in leafy vegetable plants is provided, according to what is defined in the independent claim 7.

In still further aspect, use of organic osmolytes to retard leaf tissue senescence in leafy vegetable plants is provided, according to what is defined in the independent claim 8.

In further aspect, use of organic osmolytes to improve quality of leafy salad crops is provided, according to what is defined in the independent claim 9.

In embodiments, said at least one organic osmolyte is provided as a betaine compound. In embodiments, the betaine compound is selected from glycinebetaine, proline betaine, and beta-alanine betaine. In embodiment, the at least one organic osmolyte is glycinebetaine. In embodiments, the leafy vegetable plant is hydroponically cultivated in a greenhouse or in a plant factory.

The utility of the present invention arises from a variety of reasons depending on each particular embodiment thereof. Primarily, the invention generally aims at enhancing quality of leafy vegetable plants, in particular, leafy salad crops feasible for industrial cultivation. In particular, the invention aims at producing leafy vegetable crops, in which nitrate content is preserved within the value range(s) set by the appropriate EU Regulation(s), and, in any case, well below the maximum values prescribed by said regulations. Thus, the invention allows for cultivating e.g. lettuce species having nitrate content decreased almost by half of what is allowed by the EU Regulation No 1258/2011 (approximately 2200 ppm compared to the allowed maximum for lettuce: 4000-5000 ppm).

The invention is particularly beneficial for exploitation with the industrial hydroponics based cultivation methods, such as NFT methods. Significant losses, associated with reverting non-compliant with the aforesaid EU Regulations salad greens back to the farmer(s), can be avoided. Overall, the invention adds to sustainability and cost-effectiveness of leafy vegetables' commercial cultivation methods, in particular, those employed in modern greenhouses and plant factories.

The invention is further beneficial in a sense that it does not require elimination of nitrate fertilizers. It is generally accepted that nitrate constitutes the most important form of nitrogen taken up readily in large amounts by the most agriculturally important plants to attain maximal yields. The invention thus allows for attaining nitrate reduction in green foliage on a background of a standard fertilization regime.

It further goes without saying that reduction of nitrate in vegetable plants markedly decreases potential health risks and implications generally associated with the consumption of industrially cultivated leafy vegetable crops by human beings.

Present disclosure further provides strong evidence that reduction of nitrate in said leafy vegetable plants is accompanied by additional beneficial effects, such as retardation of leaf tissue senescence (leaf ageing), elimination or at least prominent decrease in leaf wilting, and increase in dry matter levels in plant foliage. The latter tightens the plant tissue structure, thus allowing for prolonged shelf- and storage life of leafy vegetable products and rendering a plant with an appearance most appealing to a consumer.

In present disclosure, the expressions "leafy vegetable plant", "leafy salad vegetable plant", "leafy salad green", "salad green", "leafy salad crop", "salad crop", "leafy vegetable green" and the like, are used interchangeably and refer, in a non-limiting manner, to plants with prominent foliage suitable for human consumption, inter alia, in fresh (uncooked) state.

The expression "a number of" refers hereby to any positive integer starting from one (1), e.g. to one, two, or three. The expression "a plurality of" refers hereby to any positive integer starting from two (2), e.g. to two, three, or four.

Different embodiments of the present invention will become apparent by consideration of the detailed description.

DETAILED DESCRIPTION OF THE EMBODIMENTS

Figure 1:
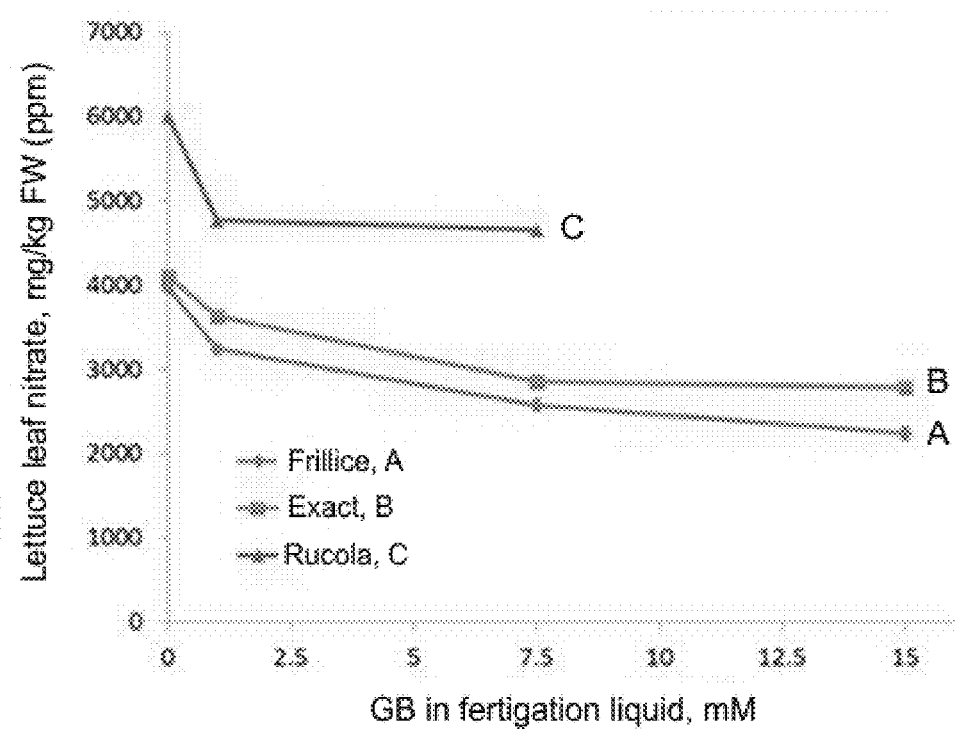
FIG. 1 is a graph illustrative of the effect exerted by an osmolyte, according to an embodiment, onto nitrate content in a leafy vegetable plant.

The invention, according to one aspect, pertains to a method for reducing nitrate content in leafy vegetable plants.

In preferred embodiment, the method comprises delivering a predetermined amount of at least one organic osmolyte to the plant.

Upon being exposed to abiotic stress, such as drought, soil salinity and extreme temperatures, plants exhibit changes in intracellular content of small, water-soluble organic molecules that contribute to enhanced stress tolerance. These molecules are collectively referred to as osmolytes or compatible solutes, due to their ability to accumulate to high concentrations within cells without interfering into cell metabolism and/or without compromising functional activities of the cell. Mentioned abiotic stress is typically manifested as osmotic stress; therefore, compatible solute compounds are thought to act via restoring and/or maintaining osmotic potential of cell, a process, known as osmoregulation.

Thus, on the contrary to inorganic osmolytes (viz. inorganic salts) that perturb the metabolic function of the cell, e.g. a protein function, organic osmolytes do not interfere into cell metabolism.

Some organic osmolytes with the osmoregulating and/or osmoprotective function accumulate in plants by increasing the rate at which they are synthesized. However, some plants lack ability to synthesize the compounds with osmoregulating/osmoprotective functions, in particular, plants grown in conditions of industrial cultivation, viz. greenhouse- and/or plant factory cultivation.

The research underlying the present invention had guided the inventors to a surprising outcome that in conditions of hydroponics based cultivation, in particular, in conditions of commercially important NFT cultivation, delivery of a predetermined amount of the at least one organic osmolyte compound to a leafy vegetable plant had markedly reduced nitrate content in said plant.

The at least one organic osmolyte can be selected from the group consisting of: methylamines, amino acids and derivatives thereof, sugars, and sugar alcohols.

In embodiments, the at least one organic osmolyte is a betaine compound. In embodiments, the betaine compound includes, but is not limited to glycinebetaine, proline betaine and beta-alanine betaine.

Betaine compounds are N-methylated amino acid derivatives known to accumulate in algae, in particular, marine algae, and in some higher plants, such as in plants of the genus *Beta vulgaris*, in particular, in sugar beet (the latter constituting the *B. vulgaris* cultivar group). Betaine compounds identified in plants include glycinebetaine, proline betaine and nicotinic acid N-methylbetaine (trigonelline) (De Zwart et al, [1]).

Use of betaine compounds in improving the yield of plants is recognized in EP0831699 (Pehu et al), for example.

In some instances, utilization of glycinebetaine is advantageous due to its commercial availability and relatively low cost.

Glycinebetaine (GB), the most abundant betaine compound in plants, is synthesized and transported in the cells in response to stress in such plant crops as sugar beet and a number of cereal crops (e.g. barley, wheat). However, a plurality of agricultural crops, including leafy salad crops, lacks the ability to synthesize glycinebetaine. In such as event, glycinebetaine can be delivered to crops externally.

Glycinebetaine (CAS 107-43-7, EINECS 203-490-6), also known as trimethylglycine, lycine or oxyneurine, is a non-toxic, odourless, flavourless and colorless compound, commercially derivable from sugar beet molasses and seaweed, or synthetically produced. Synthetic glycinebetaine is typically provided in the form of betaine hydrochloride.

The role of glycinebetaine as a compatible solute has been recognized for years in studies of plant adaptation to saline or dry environments. GB has been shown to accumulate in the cytoplasm of plant cells to contribute to the osmotic balance between the cytoplasm and vacuole without interfering into cellular metabolic pathways (Makela, [2]).

The method presented hereby aims at reducing nitrate content in leafy vegetable plants, in particular, hydroponically cultivated leafy salad crops. Thus, nitrate content has proved to reduce significantly in salad crops cultivated by the commercially viable Nutrient Film Technique (NFT).

The results of the experimental trials conducted to support the findings underlying the concept of the present invention are presented hereinbelow.

Experimental trials have been conducted with commercially available salad crop species and cultivars, comprising, in a non-limiting manner, lettuce (*Lactuca sativa*); endive (*Cichorium endivia*), also referred to as endive lettuce; and rucola (*Eruca sativa*), also referred to as rocket (rocket salad). The following cultivars have been selected for experimental purposes: (A) curly iceberg lettuce (variety Frillice), which is a cross between iceberg lettuce and curly endive; (B) curly endive, or frisee (Sweet crisp frisee var. Exact) and (C) rucola (Rocket rucola).

Mentioned species/cultivars have been cultivated utilizing conventional NFT equipment and associated conditions. In the experiments, environmental factors that could affect plant growth rate, such as nitrate concentration in nutrient solution(s) and illumination intensity, have corresponded to the conditions used in conventional industrial (NFT) cultivation, viz. nitrate concentration 180 mg/L and illumination intensity 160 $\mu mol/m^2/s$. Mentioned control values had proved optimal for achieving maximum growth rate for the salad crops, thereupon the plant reaches a fresh weight (FW) value of about 140-150 g/per plant in 6 weeks. On the other hand, mentioned conditions cause, in iceberg lettuce, for example, an increase in nitrate content to a level very close to the maximum permitted by the EU Regulation (No 1258/2011) accompanied by leaf wilting.

A preparation comprising the at least one organic osmolyte compound, hereby, glycinebetaine, has been obtained, wherein glycinebetaine has been admixed into a NFT-nutrient solution (fertigation liquid) in exemplary concentrations 1 mM, 7.5 mM and 15 mM. Said preparation has been delivered to plants in 29 days after sowing (DAS), when the plants have reached the FW value of about 50 g/per plant. Test members have been randomly placed into the greenhouse environment; and each experiment has been performed in four (4) repetitions. Amount of glycinebetaine in nutrient solution has been monitored daily.

In one (1) week thereafter (36 DAS), leaf samples have been obtained and nitrate content has been analyzed in all samples. At the time of sampling, the plants have met, in terms of weight, the usual conditions for salability (100-150 g FW/per plant). Nitrate content has been estimated using a standard measurement technique.

In brief, nitrate content has been measured by using an exemplary Horiba meter (LAQUAtwin B-731; measurement range 100-9900 mg/L) for quick analysis of nitrate content in leafy vegetable crops.

It should be noted that sporadic measurement results may vary even amongst plants cultivated in the same hydroponic growing channel. Plants in the same growing channel may receive varying amounts of fertigation liquid and/or nutrients and, as a result, have slightly diverse growth rates. Factors that cause these differences include horizontal length and slope of a cultivation channel, as well as variations in temperature and illumination conditions in a cultivation facility (e.g. in a greenhouse). Hence, in order to obtain a reliable measurement result, a number of samples must be collected throughout the horizontal length of the growing channel, e.g. from the beginning of the channel, from the end of a first third of the channel, from the beginning of a last third of the channel, and from the end of the channel.

Reliability of the results obtained from quick measurements by the above indicated metering equipment (Horiba-approach) has been verified in the laboratory by analyzing pressed plant samples for nitrate and nitrite using the standardized flow injection analysis (FIA) method combined with the colorimetric detection technique.

The results have demonstrated that a one week treatment of leafy vegetable plants by the preparation containing glycinebetaine administered through plant roots had markedly decreased nitrate content in green foliage (FIG. 1). The results are clearly dose-dependent and indicate that the higher is the osmolyte concentration (hereby, glycinebetaine concentration) in fertigation liquid, the greater reduction in nitrate content in green foliage can be observed.

Hence, in accordance with the EU Regulation No 1258/2011, maximum level of nitrate constitutes 4000-5000 units for lettuce (*L. sativa*); 2000-2500 units for iceberg type lettuce, and 6000-7000 units for rucola, wherein 1 unit=1 ppm or 1 mg of nitrate in 1 kg of fresh salad vegetables (1 mg $NO_3$/kg FW).

As one may observe from FIG. 1, nitrate concentration in green foliage has decreased, in one week of treatment according to the method disclosed hereby, to the levels well below the allowed maximum. Overall, decrease in nitrate content by about 1000-2000 units has been observed. Nitrate content measured upon termination of the experiment thus constituted approximately 2200-3000 units for lettuce (Frillice; A) and frisée (Exact; B) and approximately 4600 units for rucola (C).

It generally appears that addition of the osmolyte compound, such as glycinebetaine, into fertigation liquid leads to reduction of nitrate content in green foliage by 40-50%. The effect thus observed pertains to all aforementioned plant species.

In a number of experimental trials, it has been observed that optimal conditions for reducing nitrate content in green foliage include delivery of the osmolyte compound, hereby, glycinebetaine, during 2-7 days, at concentrations within a range of 1-30 mM. In some instances, the concentration range 1-7.5 mM has turned out particularly advantageous.

Additionally, good results have been demonstrated upon a single-dose administration of the osmolyte compound (glycinebetaine, 10 mM) 3-6 days before harvesting.

Moreover, in terms of dosage, a so called split application has been demonstrated as a viable administration route. During split administration, a typical single dose of an active compound (hereby, the osmolyte compound) is divided (split) for administration at several time points. A split dose comprises the active compound in a lower concentration, in comparison to the aforementioned single dose; therefore, each split dose is typically administered in 1-5 days intervals. A predetermined amount (e.g. 10 mM) of the active compound can thus be administered at once (single-dose), or it can be split into four equal doses (2.5 mM) for administration in few days intervals.

Administration duration and dosage can vary for different plant species and osmolyte compounds.

In embodiments, the method disclosed hereby is applicable to leafy vegetable plants, in particular, to those with edible green foliage. In some embodiment, the vegetable green plant is selected from the group consisting of lettuce, endive, and rucola (rocket), including varieties and cultivars (viz. varieties selected and cultivated by humans) thereof.

In particular, with regard to lettuce, a plurality of varieties and cultivars can be recognized, according to various classifications, that peak at different times of the year and allow for production of lettuce salads all-year-round. Generally, within the species *Lactuca sativa*, four main groups of cultivars are distinguished, based on head formation and leaf structure, as follows: *L. sativa* var. *capitata* (head lettuce that forms a tight sprouting of leaves with variable shapes; includes such cultivars as iceberg (or crisphead) and butterhead); *L. sativa* var. *longifolia* (romaine or cos lettuce); *L. sativa* var. *crispa* (leaf lettuce); and *L. sativa* var. *asparagina* (asparagus lettuce cultivated for its stems).

The method is, however, generally applicable to any kind of leafy vegetable crops of industrial importance that tend to accumulate nitrate compounds. In a non-limiting manner, the method is applicable onto species, varieties, cultivars, and crosses therebetween of the plants belonging to families Asteraceae (lettuce, endive), Brassicaceae (rucola, mustard), Apiaceae (celery, parsley) and Amaranthaceae (*Amaranthus*).

In embodiments, the method if further applicable to leafy vegetable plants harvested after cotyledon leaves of said plants have been developed and well before the plant reaches maturity. Such leafy vegetable plants are collectively referred to as "microgreens".

Microgreens are plants younger than sprouts; they are typically sold and optionally consumed on the whole, with roots and shoots. Microgreens have high nutritional value, intense flavor and taste and delicate texture. Microgreens are usually more highly priced than their fully grown counterparts, due to the mentioned delicate texture (making microgreens more difficult to harvest) and shorter shelf life (typically not exceeding 10 days).

It should be noted, that according to previous research, plants exhibit varying sensitivity to organic osmolytes, such as glycinebetaine. For example, glycinebetaine administered to turnip rape (*Brassica rapa*) at a concentration of 0.5 mM completely inhibits the growth of said plant; whereas the same at a concentration of 0.01 mM markedly improves stress tolerance of the plant (Makela et al, [3]). In light of aforesaid, the osmolyte treatment conditions applicable to e.g. oilseed plant species cannot be taken as granted with regard to plants belonging to different genera or even to different species within said genera.

In research trials underlying the present invention, reduction of nitrate content in green foliage has been observed upon delivery of the osmolyte compound into the plant through its roots and through its foliage.

When the osmolyte-containing preparation is applied through green foliage, by spraying, for example, the osmolyte compound is transported most efficiently to the newly formed parts of the plant. The osmolyte is further conveyed to roots, through which the osmolyte can be transported from one plant to another. Still, the osmolyte compound applied via spraying undergoes dilution in the plant owing to plant growth, whereby spray treatment must be repeated at predetermined intervals, whether attaining a longer-term effect is desired. Root administration pathway allows regulating concentrations of the osmolyte compounds in nutrient solutions in a more precise manner.

Additionally, root administration is preferred for industrial cultivation, such as for NFT cultivation.

Figure 2:
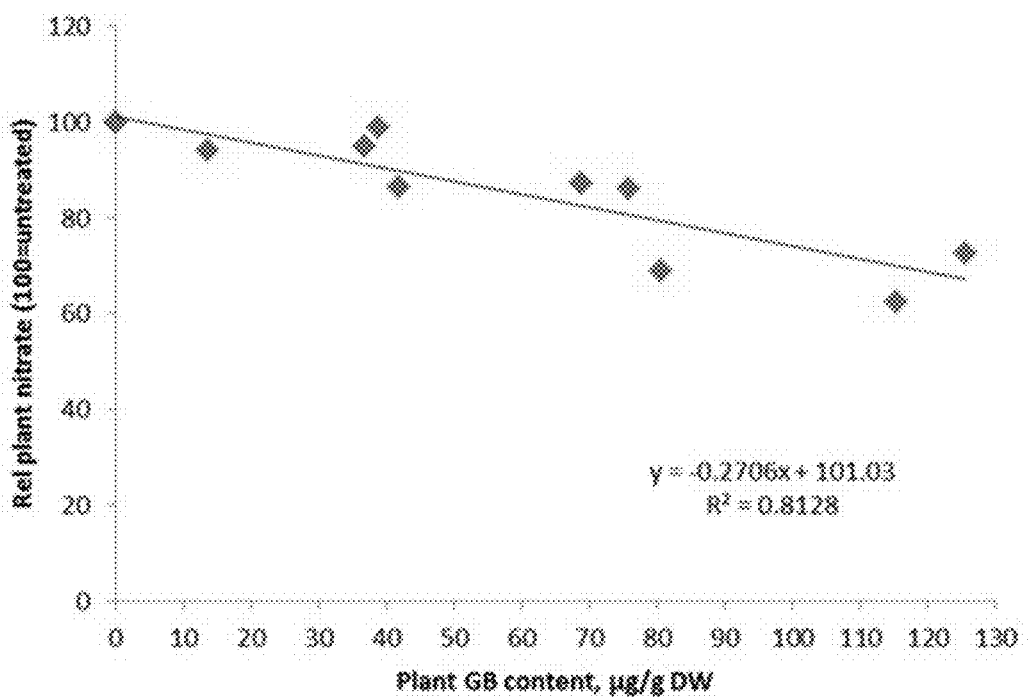
FIG. 2 is a graph illustrative of dependency between the osmolyte concentration and relative nitrate content in a leafy vegetable plant.

FIG. 2 demonstrates relationship between the concentration of the osmolyte compound in a leafy vegetable plant and relative nitrate content in said plant. Curly iceberg lettuce, var. Frillice has been selected for the experiments.

In the trials, the preparation comprising at least one osmolyte compound, hereby, glycinebetaine, has been administered for 2-7 days through roots. Typically, administration duration is optimized based on plants size and concentration of the osmolyte compound in the preparation.

On FIG. 2, nitrate content is provided in relative units (Rel), since the graph is based on the data obtained from a number of experiments. Relative nitrate content value 100 is used as a control, which corresponds, dependent on the experiment, to the nitrate content within a range of 3600-4000 ppm (mg/kg FW). Glycinebetaine content in the plant tissue (µg/g Dry Weight, DW) has been determined by standard methods, herein, by HPLC (high performance liquid chromatography).

An exemplary experiment is described hereafter. The experiment has been conducted for 60 days (days after sowing, DAS), whereupon plants have reached fresh weight approximately 350 g/per plant. It should be noted that typically plants that have reached fresh weight approximately 130 g/per plant (45 DAS) are already harvested for sale; however, by extending cultivation time above said 45 DAS, the inventors aimed at analyzing the responses obtainable from older plants with more extensive foliage.

During the experiment, glycinebetaine-containing preparation has been administered to plants during one week (long-term administration) or as a single dose (one-time administration). Concentration of said osmolyte compound in the single dose has been generally higher in comparison to that utilized for long-term administration.

By the way of example, the single-dose preparation comprising 10 mM glycinebetaine (GB) has been administered to plants at 45 DAS, in 3-5 days prior to harvesting. With regard to the older plants (45 DAS, GB 10 mM), glycinebetaine has been observed to reduce nitrate content by 30-40%.

The results shown on FIG. 2 clearly demonstrate that upon increasing the content of glycinebetaine in plant, relative nitrate content is reduced, in comparison to untreated control plants. Plant response, in terms of reducing nitrate content, has been independent on the age of the plant.

In an aspect, use of the preparation that comprises a predetermined amount of the at least one organic osmolyte to reduce nitrate content in leafy vegetable plants is hereby provided. In embodiment, the at least one organic osmolyte in said preparation is a betaine compound. In embodiments, the betaine compound is advantageously selected from glycinebetaine, proline betaine, and beta-alanine betaine. In embodiment, the at least one organic osmolyte is glycinebetaine.

In embodiment, the leafy vegetable plant is a plant or plants hydroponically cultivated in a greenhouse or in a plant factory.

Further experimental trials have been conducted aiming at determining the effect of the at least one osmolyte compound on dry matter content in leafy vegetable plants. The greater is dry matter content in salad crops, more tight and firm the plant tissue structure is. Such leafy salad products better withstand transportation and storage in comparison to conventional, soft-structured salads. Salad crops with enhanced dry matter content generally have longer storage life in supermarkets and also after being purchased by a consumer.

Figure 3:
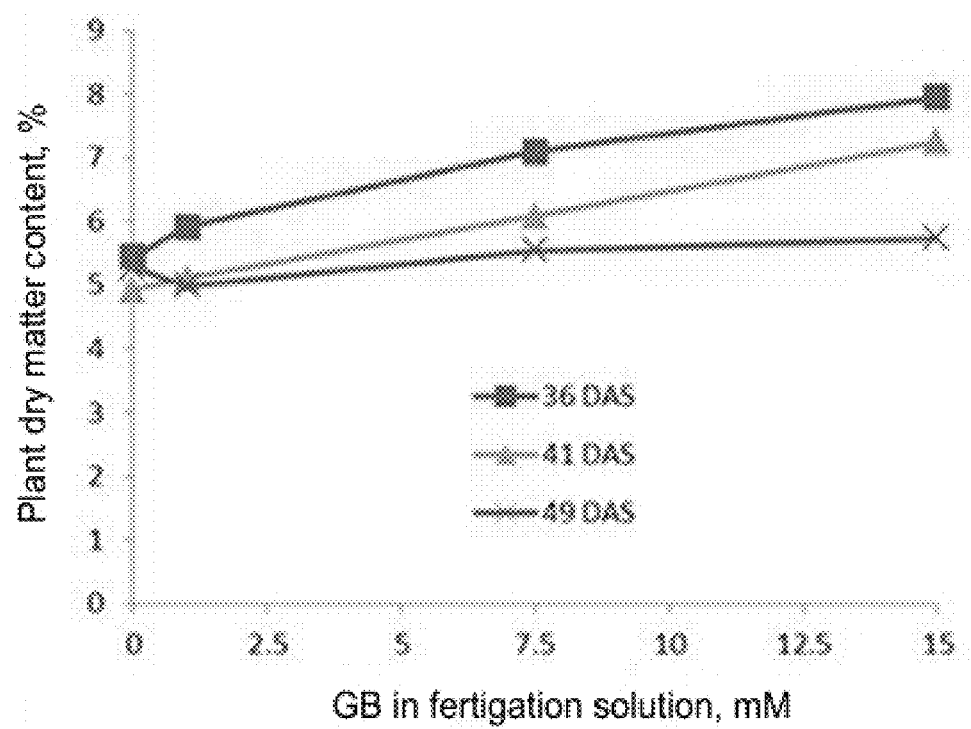
FIG. 3 is a graph illustrative of the effect exerted by an osmolyte, according to an embodiment, onto dry matter of a leafy vegetable plant.

FIG. 3 is illustrative of the effect of the organic osmolyte compound (hereby, glycinebetaine) onto the dry matter content in leafy vegetable plants upon admixing a predetermined amount of glycinebetaine into fertigation liquid during NFT cultivation. In the experiment, curly iceberg lettuce, var. Frillice has been utilized. Dry matter content in plant green foliage has been analyzed in 36, 41 and 49 days after sowing (DAS).

The results shown on FIG. 3 clearly indicate that treatment of leafy vegetable plants with glycinebetaine results in prominent increase in dry matter content in said plants.

It should be noted that treating leafy salad crops with organic osmolytes, in particular, glycinebetaine, discussed herein above, had no effect on plant aroma and flavor (taste). Taste trials for lettuce have been arranged for a jury of 10 individuals that all have reported an absence of changes in taste of the osmolyte-treated products compared to the untreated ones. Thus, the osmolyte treatment exhibits no negative effects on taste and aroma of the salad crop products.

During experimental trials aiming at investigating the effects exerted by organic osmolytes on quality of leafy salad crops, the inventors had made an observation that treatment of said leafy salad crops with a preparation comprising a predetermined amount of at least one organic osmolyte leads to retardation of leaf tissue senescence (ageing of leaves) in hydroponic cultivation. Additionally, a pronounced reduction in retardation-induced foliage decay has been observed.

The experiments have been conducted by treating salad species frisée (var. Exact) cultivated in greenhouse conditions through exploitation of the NFT method by the preparation containing glycinebetaine (GB). The preparation contained predetermined amounts of GB in fertigation solution; therefore, the osmolyte has been delivered to plants via roots. The effect of glycinebetaine on leaf senescence has been monitored at the end of the experiment, viz. in 44 days after sowing, DAS.

Four (4) experiments have been undertaken as follows:
Experiment 1. Control (GB 0);
Experiment 2. GB 1 mM (applied DAS 32);
Experiment 3. Split application, as follows: GB 1 mM (applied DAS 29)+GB 1 mM (applied DAS 32)+GB 1 mM (applied DAS 37); and
Experiment 4. GB 4 mM (applied DAS 32).

In each treatment, 16 plants per treatment have been monitored (n=16), wherein each plant consisted of approximately 25 leaves per plant.

A leaf has been considered to be senescent, when it turned, at least partly, brown and/or yellow and/or pale in color. During senescence, leaf cells undergo degradation of cellular structures, which is most distinctively observed in chloroplasts, where it is accompanied by the change of leaf color due to degradation of chlorophylls. Thus, the leaf has been considered as senescent when its typical green color had at least partly disappeared. Discolouration of leaves has been monitored by assessing chlorophyll content in leaves via measurements of leaf transmittance using standard techniques, hereby, a SPAD meter.

Figure 4A:
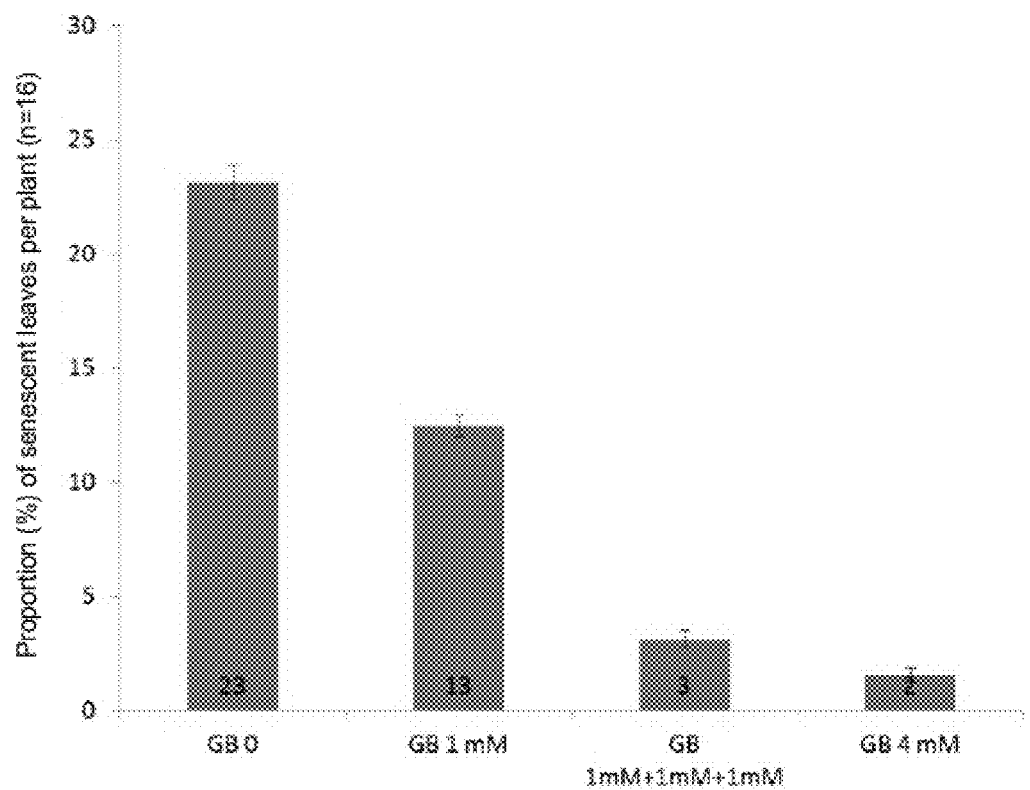
FIGS. 4A and 4B depict the results obtained from leaf senescence experiments.
Figure 4B:
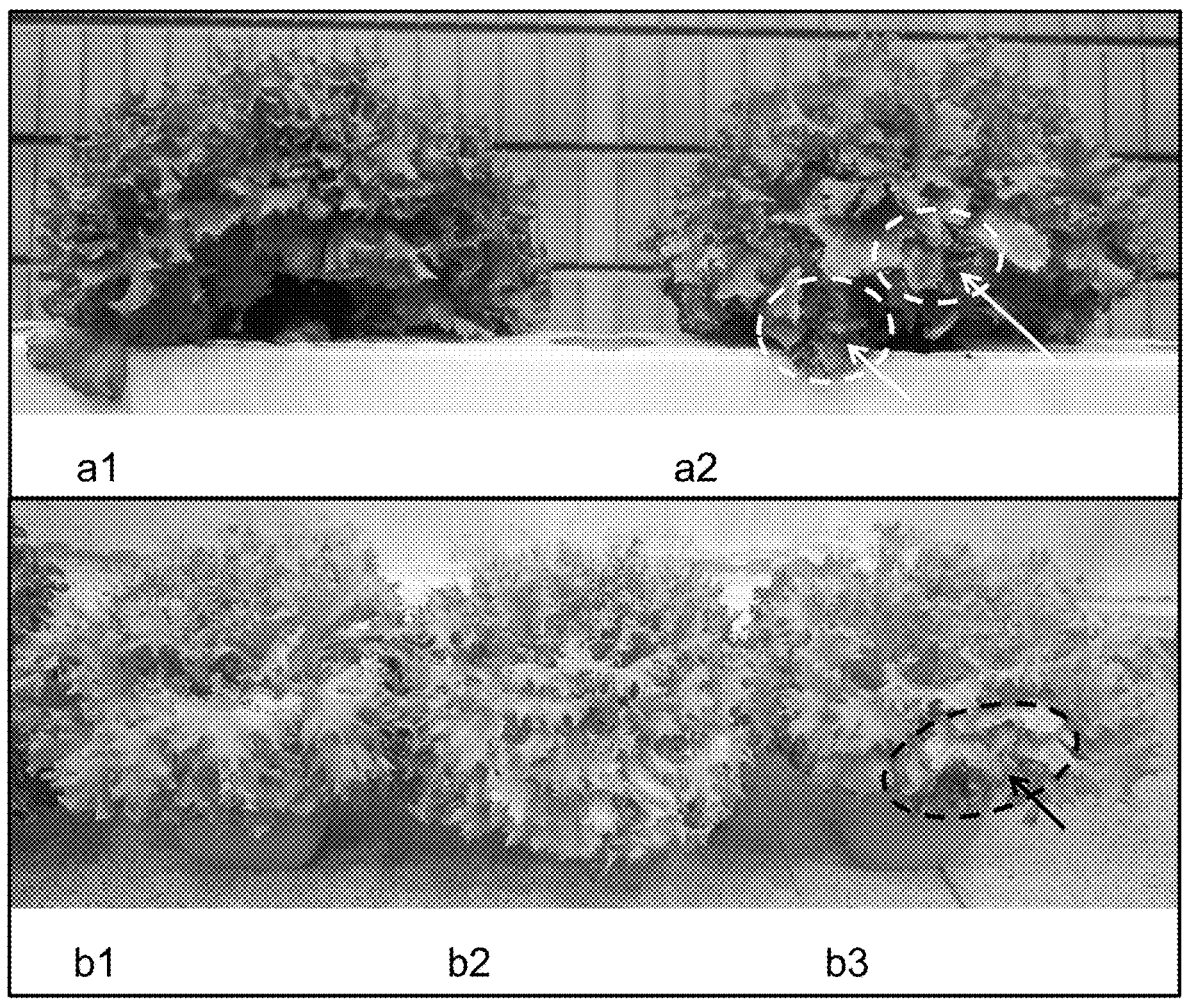

FIGS. 4A and 4B depict the results obtained from leaf senescence experiments.

FIG. 4A is a graph illustrative of the senescence retardation effect observed upon delivering of the at least one organic osmolyte to the leafy vegetable plant. The organic osmolyte has been glycinebetaine. From FIG. 4A one may observe that upon admixing of glycinebetaine into the fertigation solution, senescence of salad crops foliage at harvest (44 DAS) can be significantly decreased. FIG. 4A shows that the highest proportion (23%) of senescent leaves had occurred in plants treated by the fertigation solution void of glycinebetaine (GB 0).

On the contrary, the lowest proportion (2-3%) of senescent leaves had occurred in plants, treated by the fertigation solution, into which glycinebetaine has been added once at a concentration of 4 mM (Experiment 4) and in plants treated by the fertigation solution, into which glycinebetaine has been added three times in 3-5 days intervals (split application, 1 mM+1 mM+1 mM; Experiment 3).

Upon a single-time addition of glycinebetaine, at a concentration of 1 mM (Experiment 2), into fertigation solution, the proportion of senescent leaves has been lower compared to the control (GB 0; Experiment 1), but higher, compared to the Experiments 3 and 4. Hence, the results clearly indicate that only at thoroughly selected concentrations shall the organic osmolyte compound decrease the senescence of leaves in leafy vegetable plants.

FIG. 4B shows photographs of the plants, hereby frisée (var. Exact), at harvest (44 DAS). Upper panel demonstrates, at a1 and a2, the results obtained in Experiments 3 (GB 1 mM+1 mM+1 mM) and 1 (GB 0), accordingly; whereas the lower panel demonstrate, at b1, b2 and b3, the results obtained in Experiments 4 (GB 4 mM), 3 (GB 1 mM+1 mM+1 mM) and 1 (GB 0), accordingly. It has been further observed that senescent leaves had appeared as the oldest leaves in the plant and had located at the base of said plant (FIG. 4B, a2, b3). Senescent leaves are indicated on FIG. 4B by dashed circles and by arrows (a2, b3).

In an aspect, use of the preparation that comprises a predetermined amount of the at least one organic osmolyte to delay or to retard leaf senescence in leafy vegetable plants, is thus provided. In embodiment, the at least one organic osmolyte in said preparation is a betaine compound. In a non-limiting manner, the betaine compound is provided as any one of glycinebetaine, proline betaine, and beta-alanine betaine. In some instances, said at least one organic compound is glycinebetaine.

The leafy vegetable plant is advantageously a plant or plants hydroponically cultivated in a greenhouse or in a plant factory.

Based on the latter observation, it can be concluded that treatment of leafy vegetable plants with the preparation comprising the at least one osmolyte, allows for markedly reducing leaf tissue wilting that accompanies senescence of the plant. This observation further supports the fact that treating leafy salad crops with the osmolyte preparation, e.g. with the glycinebetaine preparation, results in inhibition of leaf tissue wilting caused by external factors, e.g. excessive illumination.

A number of experiments has been conducted to confirm that the osmolyte compounds exert the same nitrate-reducing effect onto leafy vegetable plants also in a commercial-scale cultivation, such as in a plant factory, for example. The results of these experiments are summarized on FIG. 5. On FIG. 5, leaf nitrate content is provided in relative units (Rel), since the graph is based on the data obtained from a number of experiments. Relative nitrate content value 100 is used as a control, which corresponds, dependent on the experiment, to the nitrate content within a range of 3600-4000 ppm (mg/kg FW).

Experimental trials have been conducted in a commercial leafy green vegetables production unit with a NFT hydroponic channel system based a cultivation method same to that in preceding greenhouse experiments. In the trials, lettuce (cultivar Danstar) was treated with a preparation comprising a predetermined amount of glycinebetaine in a fertigation solution.

Figure 5:
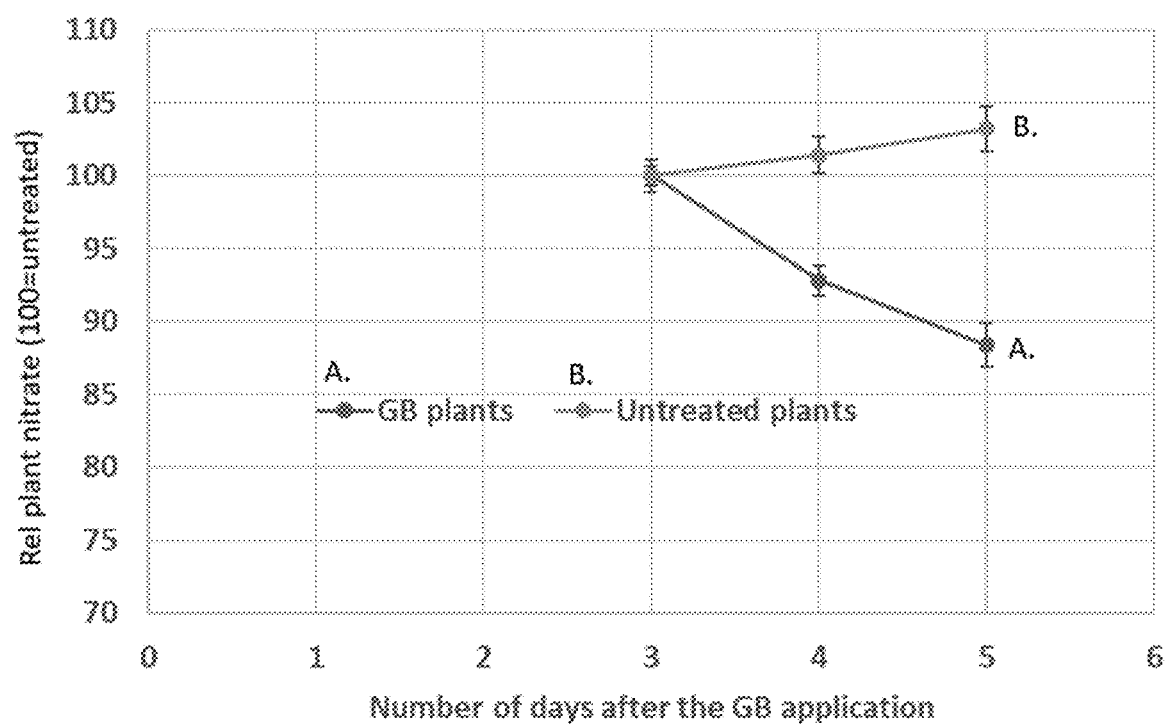
FIG. 5 is a graph illustrative of the effect exerted by an osmolyte, according to an embodiment, onto relative nitrate content in leafy vegetable plant in a commercial scale production unit.

A single dose of GB at a concentration of 7.5 mM was added into a tank with fertigation liquid on day 0, thereafter the liquid was continuously circulated through NFT gutters during a predetermined period (including several days; days 1-6 on FIG. 5). A shallow layer of water streaming through NFT gutters thus contained nutrients (from fertigation liquid) and at least one organic osmolyte (hereby, glycinebetaine) to be uptaken by roots over the experimental period. A control cultivation unit did not contain added glycinebetaine.

Samples were collected for treated (A) and untreated (B) plants at predetermined sampling points (days 3, 4 and 5; FIG. 5). FIG. 5 is thus a graph that shows adjustment of leaf nitrate content in lettuce (cv. Danstar) in a commercial scale production unit, depending on whether said lettuce plants were treated with the osmolyte compound (hereby, glycinebetaine) or not. Fully-grown and ready-to-delivery lettuce plants (having fresh weight approximately 150 g/per plant) were collected for sampling. Each sample consisted of ten plants; leaf nitrate content in each plant has been analyzed individually.

The results shown on FIG. 5 clearly indicate that significant reduction of nitrate content in green foliage can be observed when the incubation time with said osmolyte has reached about four days (line A). Approximately at this time point the osmolyte compound, hereby glycinebetaine, applied through roots, starts to exert the nitrate-reducing effect onto the leafy plant. In untreated plants nitrate reduction has not been observed (line B). This result corresponds well with the outcome of the previous studies conducted in a greenhouse and/or a growth cabinet and indicating that the leaf nitrate content in a leafy vegetable, such as lettuce, can be reduced by about 10-40% depending on the osmolyte concentration, application timing and/or size of the plants.

The results of FIG. 5 demonstrate that the osmolyte compound, such as glycinebetaine, reduces the nitrate content in leafy vegetable plants produced in a commercial scale cultivation unit ready to be delivered to the customers. Present results further demonstrate that the nitrate-reducing effect exerted by osmolyte compounds onto leafy vegetable plants is not genotype-dependent (lettuce cultivar Danstar vs curly iceberg lettuce var. Frillice used in the experiments described hereinabove). The present disclosure thus offers an efficient method for controlling nitrate content in green foliage of leafy vegetable plants in industrial cultivation.

Previous examples have demonstrated that the organic osmolyte compound, such as glycinebetaine, when applied onto leafy vegetable plants through their roots, significantly reduces nitrate content in green foliage of said plants. Concentrations of said osmolyte compound in fertigation solution varied within a range of about 4 mM to about 20 mM.

Figure 6:
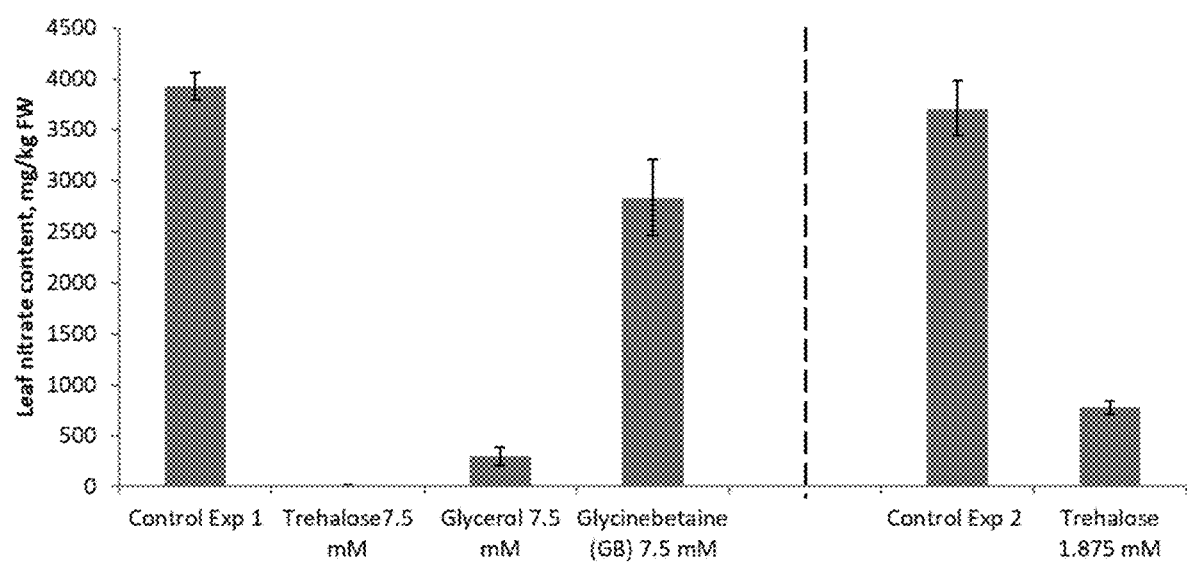
FIG. 6 is a graph illustrative of the effect exerted by the osmolyte compounds, according to the embodiments, onto nitrate content in a leafy vegetable plant.

Whether the organic osmolyte compounds generally exhibit a property of controlling/reducing nitrate content in leafy vegetable plants, has been further explored. FIG. 6 illustrates the outcome of two experiments aiming at determining the effect of different osmolyte compounds onto nitrate content in curly iceberg lettuce (var. Frillice). Osmolyte compounds selected for the experiments were a betaine compound, such as glycinebetaine, a carbohydrate sugar compound, such as trehalose, and a sugar alcohol compound, such as glycerol. Mentioned species belong to remote organic osmolyte groups in terms of chemical structure.

The results indicative of nitrate accumulation in lettuce foliage are summarized on FIG. 6 ($1^{st}$ and $2^{nd}$ experiments are separated by a dashed line). In Experiment 1 all selected osmolyte compounds were added into a complete nutrient solution at a concentration of 7.5 mM. Control experiments were conducted without osmolytes. Each treatment was conducted with four (4) plants. Plant incubation in the osmolyte-containing nutrient solution started in 18 days after sowing (DAS). Lettuce plants were grown in constant environmental conditions in a growth cabinet with light intensity of 140 µmol $m^{-2}$ $s^{-1}$ and at the ambient air temperature of 20° C. The light period was 20 hours. At the age of 32 DAS (in two weeks after starting the osmolyte treatment) the plants were harvested and their leaf nitrate content was analyzed.

Experiment 2 has been conducted using only trehalose, in order to test, whether the effect of this osmolyte compound onto nitrate content in green foliage will be preserved in lower concentrations (1.875 mM) and shorter incubation time (7 days). Additionally, the osmolyte treatment has started later (at 28 DAS) so that the plants were larger in size, accordingly, as compared to that in Experiment 1. Control experiments were conducted without osmolytes. At the age of 35 DAS (in one week after starting the osmolyte treatment) the plants were harvested and their leaf nitrate was analyzed.

From FIG. 6 it is apparent that in Experiment 1 (Exp. 1) all tested osmolyte compounds at a concentration of 7.5 mM applied through roots have caused a marked reduction in nitrate content in lettuce leaves as compared to the control (without osmolytes) during two-week treatment. According to the results of Experiment 2 (Exp. 2), trehalose has turned out to induce the most prominent nitrate reducing effect. Despite its lower concentration (1.875 mM) and shorter treatment period (one week), trehalose appeared as efficient as e.g. glycinebetaine tested in Experiment 1.

In an aspect, use of the preparation that comprises a predetermined amount of the at least one organic osmolyte to improve quality of leafy salad crops is hereby provided. In embodiment, the at least one organic osmolyte in said preparation is a betaine compound. In a non-limiting manner, the betaine compound is provided as any one of glycinebetaine, proline betaine, and beta-alanine betaine. In some instances, said at least one organic compound is glycinebetaine.

In addition to producing a prominent leaf senescence retardation effect, whereupon more chlorophyll is preserved in cellular structures, along with the substantial increase in dry matter content in plants, treatment of leafy salad crops with the at least one organic osmolyte compound, such as glycinebetaine, renders said crops commercially more attractive for end customers and eliminates the need to remove senescent (and poor-looking) leaves during harvesting and/or packaging. Moreover, treated leafy salad products have prolonged shelf life in a retail chain and at a consumer, which also accounts for improved product quality.

The leafy vegetable plant is advantageously a plant or plants hydroponically cultivated in a greenhouse or in a plant factory.

In embodiments, the leafy vegetable plant is a so called microgreen plant.

The preparation that comprises a predetermined amount of at least one organic osmolyte compound, preferably, a betaine compound, is advantageously utilized for improving quality of microgreens in terms of extending shelf- and storage life and/or enhancing post-harvest properties thereof. Thus, treating microgreens by said at least one organic osmolyte, such as glycinebetaine, for example, accounts for maintaining at least flavor and taste, as well as appearance (color, density) of the microgreen plants for a longer time (up to two weeks) after harvesting.

The method for reduction of nitrate content in leafy vegetable plants discussed hereinabove and the related preparation can further advantageously exploit a number of organic osmolyte compounds other than betaine. Hence, a number of amino acids, in particular, proline and/or glycine, and derivatives thereof, such as ectoine, taurine and sarcosine; carbohydrate sugars, in particular, trehalose; and sugar alcohols, such as sorbitol, mannitol and D-ononitol, for example, can be utilized. Additionally, such betaine compounds as dimethylsulfoniopropionate (sulfonium betaine) and choline-O-sulfate (ammonium betaine, a member of choline sulfates), can be further utilized.

That a variety of organic osmolytes can be used to efficiently regulate the nitrate content in leafy vegetable plants is evident from the results presented on FIG. 6. The osmolyte participating in the study (a betaine compound, a carbohydrate sugar compound and a sugar alcohol compound) clearly represent distant, in terms of chemical structure, groups of organic osmolyte compounds. Nevertheless, all these compounds demonstrate the same mode of action with regard to regulating the osmotic balance in plant metabolism and controlling/reducing nitrate accumulation on leafy vegetable plants.

Osmoprotective function of these compounds has been recognized in (higher) plants. Organic osmorotectants are generally known to avoid participation in any biochemical reactions in the cell and are stored in the cytosol.

The mode of action of the osmolyte compounds with regard to reduction of nitrate content in leafy vegetable plants is allegedly based on an ability of said compounds to adjust osmotic potential in plant cells.

In nitrophilic plants, such as leafy vegetables, absorbed nitrates are either reduced and assimilated into organic forms of nitrogen (amino acids and proteins) in cytoplasm of the plant cells, or temporarily stored, in the form of free ions, in vacuoles. However, only 10-20% nitrates are used in cell metabolism; whereas the remaining 80-90% nitrates are preserved in a vacuolar nitrate pool, accordingly. Accumulated nitrate contributes to the osmotic potential of the cell by maintaining a near-constant nitrate concentration in the cytoplasm for reduction and assimilation. In conditions of excessive nitrate uptake (from nutrient solutions, for example), the capacity of the plant to metabolize free nitrate from the vacuolar pool is low, therefore concentration of nitrates in green foliage increases owning to established imbalance between nitrate net absorption and assimilation rates. This is the prevalent situation in conditions of industrial hydroponics based cultivation in greenhouses and plant factories, such as in NFT cultivation.

The osmolyte compounds, such glycinebetaine, accumulate in the plant cell cytoplasm and adjust osmotic balance between cytoplasm and vacuole. Presence of other, than nitrate, regulators of osmotic balance in the plant cell allegedly allows the plant allocating less nitrate into the vacuolar pool, whereby content of nitrate in green foliage is reduced.

It should be clear to a person skilled in the art that the inventive concept is intended to cover various modifications of basic embodiments disclosed hereby. The examples presented hereinabove are understood to be illustrative of various embodiments of the present invention and should not be understood restrictively with respect to the scope of appended claims.

REFERENCES

1. De Zwart et al. 2003. Glycine betaine and glycine betaine analogues in common foods. Food Chem. 83(2):197-204.
2. Mäkela, Pirjo. 2004. Agro-industrial uses of glycinebetaine. Sugar Tech. 6(4):207-212.
3. Makela et al. 1997. Growth response of pea and summer turnip rape to foliar application of glycinebetaine. Acta Agriculturae *Scandinavica*, Section B. 47(3):168-175.

The invention claimed is:

1. A method for reducing nitrate content in a leafy vegetable plant, wherein the method comprises delivering a predetermined amount of at least one organic osmolyte to the plant, wherein the plant is hydroponically cultivated and wherein the at least one organic osmolyte is delivered into the plant through roots of the plant.

2. The method of claim 1, wherein the at least one organic osmolyte is an amino acid or a derivative of an amino acid.

3. The method of claim 1, wherein the at least one organic osmolyte is a betaine compound.

4. The method of claim 3, wherein the at least one organic osmolyte is glycinebetaine, proline betaine or beta-alanine betaine.

5. The method of claim 1, wherein the plant is cultivated by a Nutrient Film Technique (NFT) in a greenhouse or in a plant factory.

6. The method of claim 1, wherein the leafy vegetable plant is lettuce, endive, or rucola.

7. The method of claim 2, wherein the at least one organic osmolyte is a betaine compound.

8. The method of claim 2, wherein the plant is cultivated by a Nutrient Film Technique (NFT) in a greenhouse or in a plant factory.

9. The method of claim 3, wherein the plant is cultivated by a Nutrient Film Technique (NFT) in a greenhouse or in a plant factory.

10. The method of claim 4, wherein the plant is cultivated by a Nutrient Film Technique (NFT) in a greenhouse or in a plant factory.

11. The method of claim 7, wherein the plant is cultivated by a Nutrient Film Technique (NFT) in a greenhouse or in a plant factory.

12. The method of claim 2, wherein the leafy vegetable plant is lettuce, endive, or rucola.

13. The method of claim 3, wherein the leafy vegetable plant is lettuce, endive, or rucola.

14. The method of claim 4, wherein the leafy vegetable plant is lettuce, endive, or rucola.

15. The method of claim 5, wherein the leafy vegetable plant is lettuce, endive, or rucola.

16. The method of claim 7, wherein the leafy vegetable plant is lettuce, endive, or rucola.

17. The method of claim 8, wherein the leafy vegetable plant is lettuce, endive, or rucola.

18. The method of claim 9, wherein the leafy vegetable plant is lettuce, endive, or rucola.

19. The method of claim 10, wherein the leafy vegetable plant is lettuce, endive, or rucola.

20. The method of claim 11, wherein the leafy vegetable plant is lettuce, endive, or rucola.

* * * * *